UNITED STATES PATENT OFFICE.

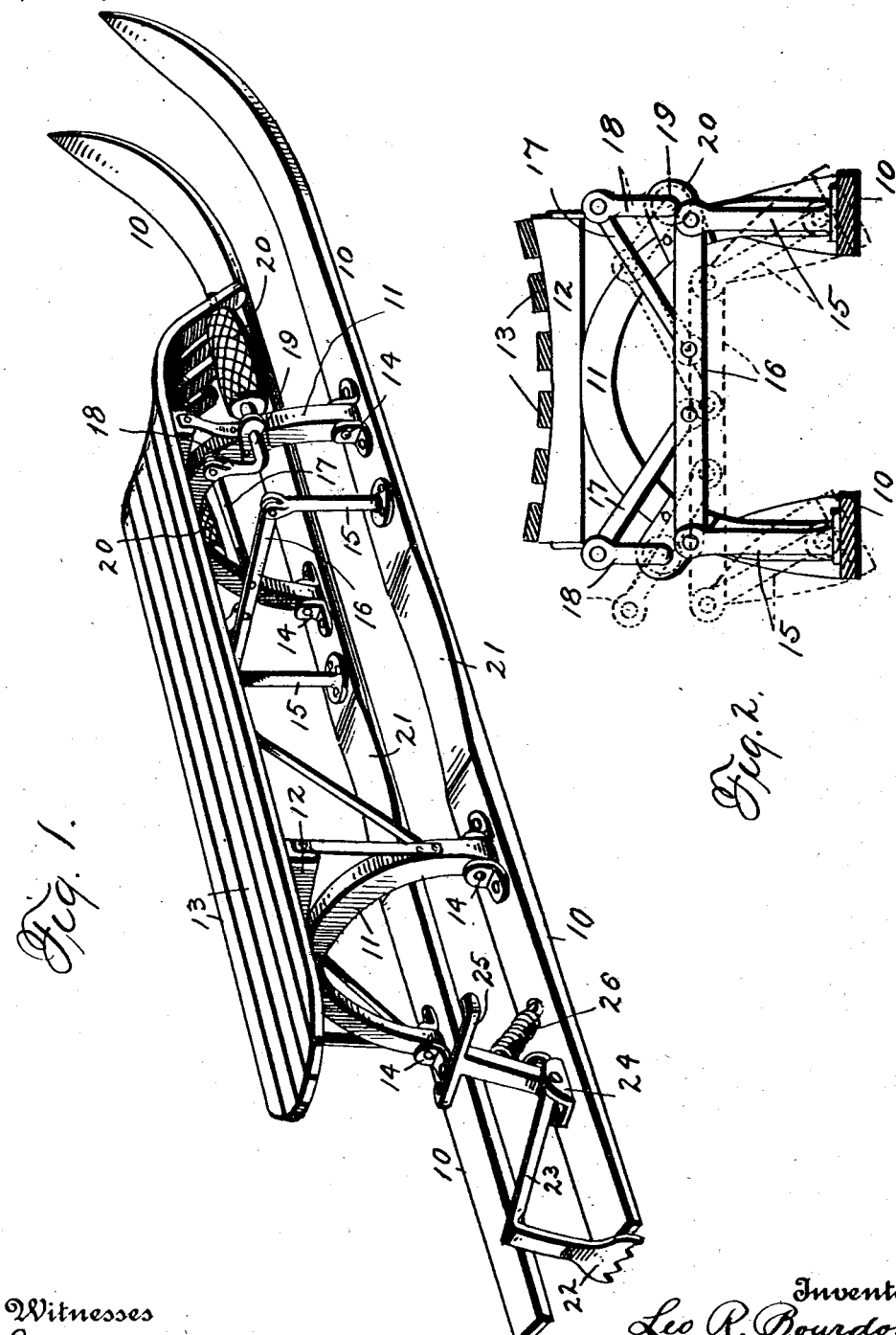

LEO R. BOURDON AND ALLEN P. BOURDON, OF WOODSTOCK, VERMONT.

SLED.

1,160,569.   Specification of Letters Patent.   Patented Nov. 16, 1915.

Application filed August 28, 1913. Serial No. 787,145.

*To all whom it may concern:*

Be it known that we, LEO R. BOURDON and ALLEN P. BOURDON, of Woodstock, in the county of Windsor, and in the State of Vermont, have invented a certain new and useful Improvement in Sleds, and do hereby declare that the following is a full, clear, and exact description thereof.

The object of our invention is to provide a sled whose movements, especially in coasting, are within the instant and easy control of the passenger and which will afford a maximum of sport with entire comfort to the passenger and which withal will be strong and durable, and my invention accordingly consists in the construction substantially as hereinafter specified and claimed.

In the accompanying drawings Figure 1 is a perspective view of a sled embodying our invention; Fig. 2 is a cross section looking forward, the full lines showing the position of the runners for going straight forward and the dotted lines showing their position when they are tilted to cause the sled to make a turn.

In making our invention we employ a pair of runners 10 of the form of a skee and preferably of the proportions of the skee, that is to say, each runner is in the form of a long broad, but comparatively thin bar that is straight throughout its length excepting at its front end where it is bent or curved upward offering at the front end of the sled, in the case of each runner, a forwardly and upwardly inclined broad snow-engaging surface. Runners thus constructed are admirably suited for deep snow, and when connected with the sled so that they may be rocked or turned on a longitudinal axis and present the upwardly and forwardly inclined ends at an angle to the snow, they constitute an easily controlled and highly efficient steering means, all as is more fully set forth hereinafter.

The two runners are connected to a frame, which, as shown, comprises two inverted U-shape cross bars 11, each cross bar having secured to its top a horizontal cross bar 12. Secured to the upper side of the two horizontal cross bars 12, are a series of longitudinally extending slats 13, which, at their forward ends in advance of the forward cross bars are curved downward and thus a flexible or elastic support is provided upon which the passenger may lie prone, as is usual in coasting, with his body supported comfortably without any likelihood of bruises or other injuries from unexpected shocks or jars.

The connection between the skees or runners and the bottoms of the legs formed by the inverted U-shape cross bars 11, consists in each case of a pivot, or hinge 14, the axis of the hinge or pivot extending longitudinally of the runner so that the runner may be rocked or turned on a longitudinal axis in a direction crosswise of the sled and thereby the position of the runner changed from the horizontal one, as shown in full lines in Fig. 2 to the inclined one shown in dotted lines in Fig. 2, and the upwardly and forwardly curved or inclined front end of the runner set at an angle so that in impinging or striking against the snow in its onward movement at an angle, the effect will be to deflect or turn the sled to the right or to the left according to the direction in which the runners are rocked on their pivotal connections with the cross bars 11. Attached to the upper side of each skee, or runner, is a post or bracket 15, and at their upper ends the two posts are connected by a cross bar or beam 16. From the cross bar 16 a link or pitman 17 in the form of a light rod extends to each side of the sled and is pivotally connected at its outer end to a crank arm 18 upon a rock shaft 19 which extends forward and at its front end is journaled, or pivoted in the downwardly turned end of the outermost body supporting slat a suitable bearing being provided near its rear end on the front cross bar 11. The rock shaft 19, for a portion of its length, has a grip handle 20 situated so that it may be readily grasped by the passenger prone upon the sled and thus the skees or runners may be easily rocked on their pivotal connections with the frame work and maintained in the desired position which may be with their lower or under sides horizontal, as for movement straight onward, or at an angle for steering. The two runners being connected together, their rocking movement will occur simultaneously and in the same direction and as there is a grip handle at each side of the sled, both hands of the passenger may be employed in the manipulation or control of the position of the runners and the grip handles are a convenience for the passenger in maintaining his position upon the sled regardless of their use for steering purposes.

Preferably at substantially midlength of each skee or runner, its thickness is reduced by thinning it down at 21 so as to render it flexible at midlength as the result of which when the runners are tilted at an angle and their forward inclined ends bear against the snow the pressure upon them will tend to push the forward ends upward and the middle portions downward. Either, or each runner may be provided with a brake, which, as shown, consists of a blade 22 having a serrated lower edge and which is carried by an arm 23 pivoted to a lug 24 on the upper side of the runner, said arm 23 having a foot-engaging extension 25 adapted to be engaged by the foot of the passenger to swing the arm to throw the serrated edge in engagement with the snow. A coil spring 26 connected at one end to the foot piece and at the other end to the runner, normally holds the brake out of acting position.

It is to be understood that our invention may be embodied in sleds with the parts differently constructed and arranged, and hence, we do not limit ourselves to the precise construction and arrangement of parts shown in the drawings and described in detail in this specification.

Having thus described our invention what we claim is—

1. In a sled, the combination of a frame having legs, runners having broad bottoms that form snow-engaging surfaces pivotally connected to the legs on axes extending lengthwise of the runners, and means for rocking the runners comprising a cranked rock shaft and connections between the runners and rock shafts.

2. In a sled, the combination of a frame having legs, runners having broad snow-engaging surfaces pivotally connected to the legs on axes extending lengthwise of the runners, and means for rocking the runners comprising a cranked rock shaft at each side of the sled, a post extending upward from each runner, a cross bar pivotally connected to the post, and a link connecting said cross bar and each of the cranks of the rock shafts.

3. A coasting device comprising a frame and runners each in the form of a skee pivotally connected to the frame, on a longitudinally extending axis, immediately adjacent each skee, upon which the skee may be rocked for steering.

4. A coasting device comprising a frame, a pair of longitudinally extending runners each in the form of a skee, and each runner being pivotally connected to the frame on an axis extending lengthwise of the runner and immediately adjacent thereto, and means for simultaneously rocking both runners.

5. A coasting device comprising a frame, a pair of runners, each consisting of a broad thin strip with an upturned forward end, and presenting a broad snow-engaging surface, a movable connection between each runner and the frame immediately adjacent the runner permitting rocking of each runner on an axis extending longitudinally thereof, and means whereby both runners may be rocked to change the position of their broad snow-engaging surfaces with reference to the surface over which they are sliding.

In testimony that we claim the foregoing we have hereunto set our hands.

LEO R. BOURDON.
ALLEN P. BOURDON.

Witnesses:
T. R. PICARD.
K. A. PEMBER.